US011167958B2

(12) United States Patent
    Udd

(10) Patent No.:     US 11,167,958 B2
(45) Date of Patent:       Nov. 9, 2021

(54) HOSE GUIDING DEVICE FOR A CRANE TOOL

(71) Applicant: Komatsu Forest AB, Umeå (SE)

(72) Inventor: Erik Udd, Umeå (SE)

(73) Assignee: Komatsu Forest AB, Umeå (SE)

( * ) Notice: Subject to any disclaimer, the term of this patent is extended or adjusted under 35 U.S.C. 154(b) by 486 days.

(21) Appl. No.: 16/309,041

(22) PCT Filed: Jun. 9, 2017

(86) PCT No.: PCT/SE2017/050617
§ 371 (c)(1),
(2) Date: Dec. 11, 2018

(87) PCT Pub. No.: WO2017/217917
PCT Pub. Date: Dec. 21, 2017

(65) Prior Publication Data
US 2019/0193997 A1    Jun. 27, 2019

(30) Foreign Application Priority Data
Jun. 16, 2016 (SE) .................................... 1650852-5

(51) Int. Cl.
*B66C 13/14* (2006.01)
*B66C 1/68* (2006.01)
(Continued)

(52) U.S. Cl.
CPC ............... *B66C 13/14* (2013.01); *B66C 1/68* (2013.01); *B66C 3/16* (2013.01); *B66C 13/12* (2013.01); *E02F 9/2275* (2013.01); *F16L 57/00* (2013.01)

(58) Field of Classification Search
CPC .. B66C 13/14; B66C 1/68; B66C 3/16; B66C 13/12; E02F 9/2275; F16L 57/00
(Continued)

(56) References Cited

U.S. PATENT DOCUMENTS 8,757,956 B2 * 6/2014 Thompson ............ E02F 9/2275
                                                414/680
8,951,001 B2 * 2/2015 Lau ........................ E02F 3/36
                                                414/723
(Continued)

FOREIGN PATENT DOCUMENTS

AT        13721 U        7/2014
CA     2820565 A1        1/2015
(Continued)

OTHER PUBLICATIONS

International Search Report for PCT Application No. PCT/SE2017/050617 dated Aug. 24, 2017 in 4 pages.

*Primary Examiner* — Craig M Schneider
*Assistant Examiner* — David R Deal
(74) *Attorney, Agent, or Firm* — Knobbe, Martens, Olson & Bear, LLP

(57) ABSTRACT

The invention concerns an arrangement for the guidance of flexible lines that run from a crane arm (3) through its end section (2) to a tool (4), that is suspended at the crane arm through a link arrangement (5) and a frame that is a component of a rotator (6) for rotation around a vertical first axis (A) and in a cardan manner around second (B) and third (C) horizontal axes,
For the discrete and protected passage of hoses, it comprises
a first holder (35) in an opening (3A) of the end section (2),
a second holder (38) in a central region of the rotator (6),
a first hose package (1A-1D) that extends between the said first (35) and second holders (38),
a penetration (26) in a central region of the rotator (6) and permitting hydraulic fluid to pass through the rotator (6) and onwards to a lower part (18) of the same
(Continued)

at least one of the said second (B) and third (C) horizontal axes comprises an "open joint".

12 Claims, 5 Drawing Sheets

(51) Int. Cl.
*B66C 3/16* (2006.01)
*B66C 13/12* (2006.01)
*E02F 9/22* (2006.01)
*F16L 57/00* (2006.01)

(58) Field of Classification Search
USPC .......................................................... 285/24
See application file for complete search history.

(56) References Cited

U.S. PATENT DOCUMENTS

| | | | |
|---|---|---|---|
| 9,469,964 B2 * | 10/2016 | Nakamura | E02F 9/2275 |
| 9,745,714 B2 * | 8/2017 | Lubbers | E02F 9/2275 |
| 10,676,324 B2 * | 6/2020 | Weeks | H01R 13/6275 |
| 11,028,552 B2 * | 6/2021 | Auvinen | E02F 3/3681 |
| 2005/0017528 A1 | 1/2005 | Ekman | |
| 2011/0132862 A1 * | 6/2011 | Wimmer | B66C 13/14 212/347 |
| 2012/0306195 A1 | 12/2012 | Fowkes et al. | |
| 2013/0056588 A1 | 3/2013 | Harr et al. | |
| 2013/0216343 A1 * | 8/2013 | Johannes | B66C 23/701 414/680 |
| 2015/0016934 A1 | 1/2015 | Cooper et al. | |
| 2015/0239713 A1 * | 8/2015 | Ward | B66C 3/04 294/198 |
| 2015/0336778 A1 * | 11/2015 | Ditzler | A01D 34/866 248/68.1 |

FOREIGN PATENT DOCUMENTS

| | | |
|---|---|---|
| EP | 1889808 A1 | 2/2008 |
| WO | 03057615 A1 | 7/2003 |
| WO | 2014129954 A1 | 8/2014 |

* cited by examiner

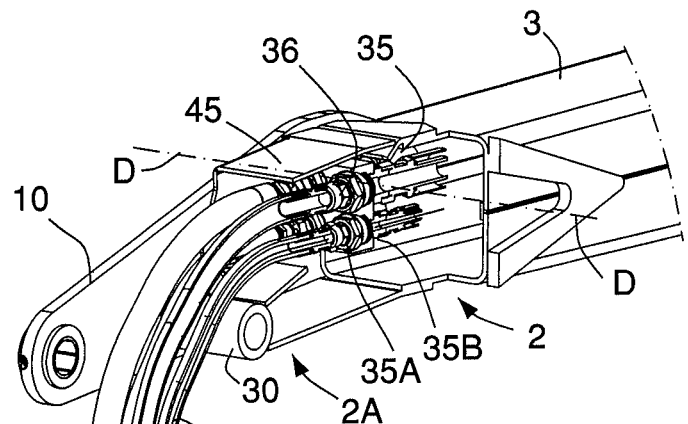
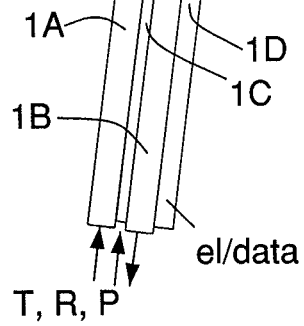
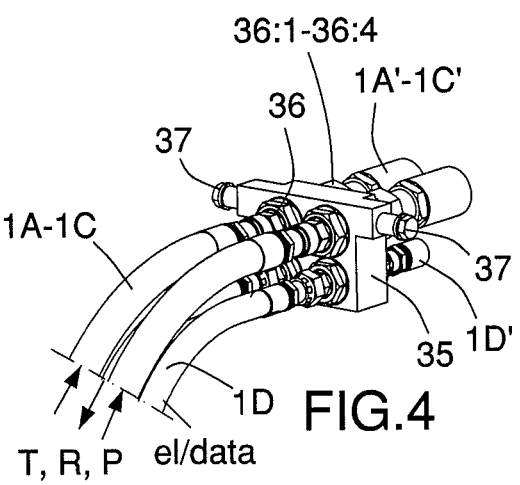
FIG.3
FIG.4
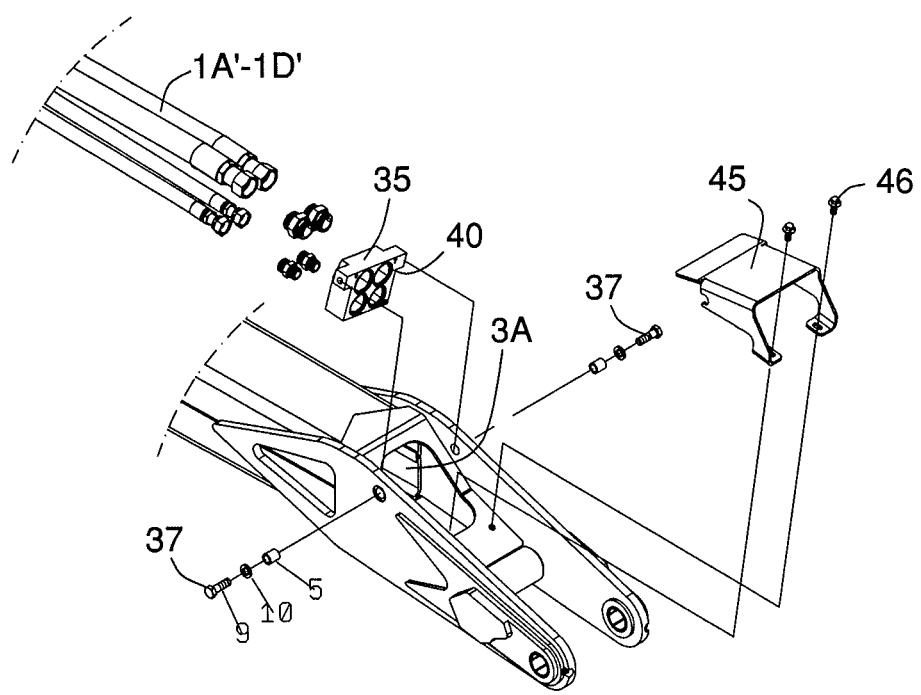
FIG.5 ated around two perpendicular horizontal pivot axes and rotatable around their own axis with the aid of a rotator. A crane arm of this type is normally mounted on a vehicle and arranged to pivot in a horizontal plane accompanying a driver's cabin at the vehicle. The term "its own axis" will be used below to denote the axis of rotation that is normally vertical or vertically oriented and around which the tool can be oriented through rotation.

HOSE GUIDING DEVICE FOR A CRANE TOOL

CROSS-REFERENCE TO RELATED APPLICATIONS

This application is the U.S. National Phase under 35 U.S.C. § 371 of International Application PCT/SE2017/050617, filed Jun. 9, 2017, which claims priority to Swedish Patent Application 1650852-5, filed Jun. 16, 2016. The disclosures of the above-described applications are hereby incorporated by reference in their entirety.

FIELD OF THE INVENTION

The present invention concerns a device for guiding flexible lines, hoses, cables or similar, at a crane-borne tool according to the introduction to claim 1.

BACKGROUND OF THE INVENTION

Crane-borne hydraulically powered tools such as harvester units are normally suspended in a cardan manner at the end of a crane arm by a link arrangement, pivotable around two perpendicular horizontal pivot axes and rotatable around their own axis with the aid of a rotator. A crane arm of this type is normally mounted on a vehicle and arranged to pivot in a horizontal plane accompanying a driver's cabin at the vehicle. The term "its own axis" will be used below to denote the axis of rotation that is normally vertical or vertically oriented and around which the tool can be oriented through rotation.

For communication with the tool unit, which includes hydraulic flow and the flow of electricity and data, lines in the form of hoses and electrical conductors for electricity and data are normally located on the outer surface of the arm sections, and form at the locations of joints in the crane arm protruding loops of sufficient length not only to allow the arm sections that are components of the crane to pivot and move relative to each other, but also to allow the tool to turn and carry out work. The hydraulic flow normally includes two or three communication channels that include flow from pump to consumers through a directional valve P, return flow from consumers to tank through valve R, and, where relevant, return flow directly from consumers to tank T.

Hoses of high-pressure type, known as "hydraulic hoses" have normally an internal reinforcement that limits not only bending but also the twist of the hose between its ends. Communication of hydraulic fluid from the end of the crane arm to the said rotator and possibly also to other consumers in the tool, therefore, takes place with the aid of swivels, i.e. penetrations that allow rotation, which prevent hoses from being twisted or torn away during the pivoting or rotation of the tool. Swivels that allow the communication of electricity and data or signals are also available. A swivel comprises a fixed part and a displaceable part that is connected to this by bearings in a manner that allows rotation, and is normally used to transfer in a manner that allows rotation electricity or data or combinations of these not only optically but also electrically. The most common task of the swivel, however, is to transfer flows of a medium, such as a fluid. Electrical swivels that can cope with up to nine poles are available.

It is a trend within the technical field that increasing numbers of units for the control and connection of hydraulic functions in tools are electrically connected through network cables and local networks or buses known as "CAN buses" (where "CAN" is an acronym for "controller area network") for digital data communication between nodes, control units and a central computer that is a component of a vehicle. The term "node" is here used to denote a final point or a connection point for data traffic, and the term "control unit" is here used to denote sensors or actuators for the positional control of, for example, hydraulic valves. It is important also that the necessary data communication can take place between the end of the crane arm and the control units that are components of a crane-borne tool. It should be understood that the currently available electrical swivels with lines that can be displaced relative to each other and that transfer data through electrical contact are normally not appropriate to be used during the transfer of accurate measurements or positional data. The slightest play or fault in the electrical connection to, for example, a directional valve during the execution of a maneuvering operation may have disastrous consequences.

As one way of reducing the requirement for complicated swivel solutions, it has proved to be appropriate to place, as far as is possible, sensors and actuators for positional control, such as control and regulatory equipment, hydraulic valves, etc., on a rotatable lower part of the rotator or in close proximity to the same, on a holder that is a component of the tool.

When work is carried out with a crane, the above-mentioned loops of hoses located freely on the outer surface of the arm sections may become fixed at various types of impediment, tree branches or similar, and damaged. In order to reduce these problems, attempts have been made to arrange as far as possible the hose centrally and protected, not only inside the crane arm but also in the link arrangement at which the tool is suspend at the end of the crane arm.

As an example of this, reference can be made to WO 03057615 A1, which shows how it is possible to use a combination of what are known as "open joints" in the link arrangement between the end section and the rotator of the tool, and a strategic location and "orientation" of the connecting unions of the swivel to the centre and upper surface of a swivel in the centre of the rotator. As a consequence of the open joints with coaxial bearings positioned at a distance from each other and the central location of the connection unions around the axis of pivot, it has been possible to lay free hydraulic hoses in a protected manner inside the link arrangement between the end of the crane arm and the rotator of the tool, where the hydraulic hoses to the connections of the rotator pass the joints.

Modern tools are equipped with several hydraulically powered consumers, motors and similar, which require large amounts of hydraulic fluid. At the volumes of fluid that are involved, it is particularly troublesome to arrange, with the required area of flow, hoses centrally inside the suspension arrangement between the end of the crane arm and the tool, while at the same time ensuring that the hose can be laid, bent and rotated during the pivoting motions of the tool. As a consequence of the limited space available, it has until now been necessary to use freely suspended loops of hose. Independently of the volume of fluid, it is, of course, desirable to arrange the communication of not only hydraulic medium but also electricity and data between the end of the crane arm and a crane-borne tool in as discrete and protected a manner as possible.

SUMMARY OF THE INVENTION

A first purpose of the present invention, therefore, is to achieve in a simple manner an arrangement that makes it possible to lay in a discrete and well-protected manner flexible lines, hoses and cables for not only hydraulic fluid but also electricity and data communication between the end of a crane arm and a hydraulically powered tool suspended at the end of the crane arm. A second purpose is to allow data communication to take place in an accurate and secure manner between the end of the crane arm and the control units that are components of a crane-borne tool.

It is thus a desire to achieve an arrangement that offers the transfer of measurements and positional data with such high accuracy that sensors, actuators for positional control such as control and regulatory equipment, hydraulic valves, etc., can be located on a rotatable lower part of the rotator or at a holder that is a component of the tool. Furthermore, it is a desire to reduce the number of swivels and to avoid complex swivel solutions for the transfer of not only hydraulic medium but also of electrical and data and accurate measurements or positional data.

In order to be able to transfer the required volume of hydraulic fluid, it is desirable to arrange that the hose runs inside the link arrangement in a pathway that has the form of an arc and that can cut in a gentle and sensitive manner the centre of the two perpendicular horizontal axes of pivot of the link arrangement between the end of the crane arm, in order to connect in a coaxial manner to the rotator with the axis of rotation of the tool itself.

This first purpose of the invention is achieved through an arrangement for the laying of hoses that demonstrates the distinctive features and characteristics that are specified in claim 1.

The insight that forms the basis of the invention is that significant flows can be transferred inside a link arrangement if the length of flexible hydraulic line (hydraulic hose) is offered greater possibilities to rotate, to be bent in a direction that is transverse to its length. The space available for motion can be considerably improved through the combination of arranging a swivel arrangement at the end of the crane arm and the use in the link arrangement what are known as "open joints", and arranging a penetration in the centre of the rotator. Lines for electricity and data communication, which are in general very sensitive to external influences, are in this way offered better possibilities of being arranged without the need for complicated swivel solutions to transfer electricity and, in particular, measurements and positional data, which are sensitive to disturbance.

For one embodiment of the invention, the rotator comprises a penetration that allows the communication of hydraulic fluid and of electricity and data to pass through the centre of the rotator, between an upper part and a lower part of the same, whereby lines (hoses) run in a pathway that has the form of an arc between first and second holders at the end of the crane arm and in a central region of rotation, respectively.

As a consequence of "open joints", the lines can cut through the centre of the two horizontal axes of pivot of the link arrangement in order to, through the penetration and a directional valve located on the lower surface of the rotator, communicate at a holder with a torque motor that is a component of the rotator.

The penetration allows hydraulic fluid and electricity and data to be communicated through the centre of the rotator coaxially with the axis of rotation of the tool itself. The penetration makes it possible to transfer hydraulic fluid and electricity and data to and from a region below the rotator, at a rotatable lower part of the rotator or in the vicinity of the same. This makes it possible to locate control and regulatory equipment, hydraulic valves, etc., at the tool, whereby the need for complicated swivel solutions can be reduced.

Due to the penetration of the rotator, which is located centrally or at a region around the first axis A, and due to the lines running coaxially with the axial direction of the tool, the distance between the connection points between the end of each line in between the end of the crane arm and the rotator can be extended. Further freedom of motion for the lines that are used for communication is, in this way, created.

As a result, longer and more heavy-duty hydraulic lines with improved flow capacity can be used. Through each line being offered improved mobility in the transverse direction, the forces that arise during pivoting and maneuvering of the tool at the end of the crane arm can be reduced. Not only hydraulic lines but also lines for electricity and data will in this case be bent in a smoother manner, with larger radii of curvature compared with what would have been the case if the lines were to be compelled to bend with smaller radii of curvature.

BRIEF DESCRIPTION OF THE DRAWINGS

An embodiment of the invention will be described below with reference to the attached drawings, of which:

FIG. 3 shows a perspective view of a part of the end of the crane arm that is a component of the invention with parts partially broken away and hydraulic hoses and protective hoses for electricity and data cables, in a partially cut-away view.

FIG. 4 shows a perspective view of a swivel block that is a component of the invention in a first embodiment with three hydraulic hoses including P, T and R communication channels for hydraulic fluid, and a fourth protective hose, a hydraulic hose that defines a channel for electricity and data cables, and where each hydraulic hose is associated with a separate swivel connection.

FIG. 5 shows a perspective view with partially separated parts of an end of a crane arm that is a component of the invention with a first holder block equipped with a separate swivel connection, to which one end of the relevant hydraulic hose is connected.

DETAILED DESCRIPTION OF THE PREFERRED EMBODIMENTS

Figure 1:
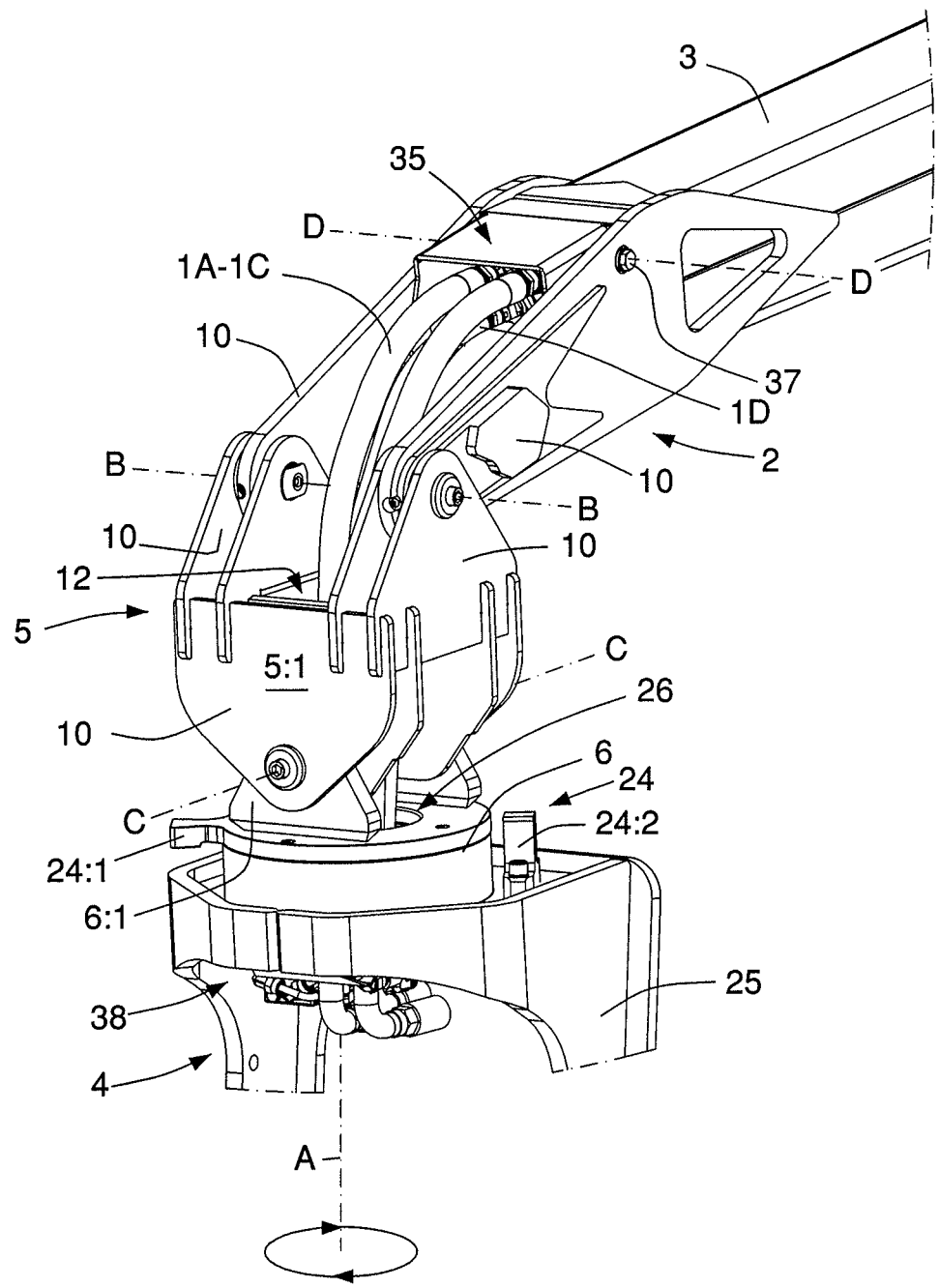
FIG. 1 shows a perspective view of an arrangement according to the present invention that shows a part of a hollow crane arm, an end of a crane arm, and a hydraulically powered tool suspended in a cardan manner through a link arrangement.
Figure 2:
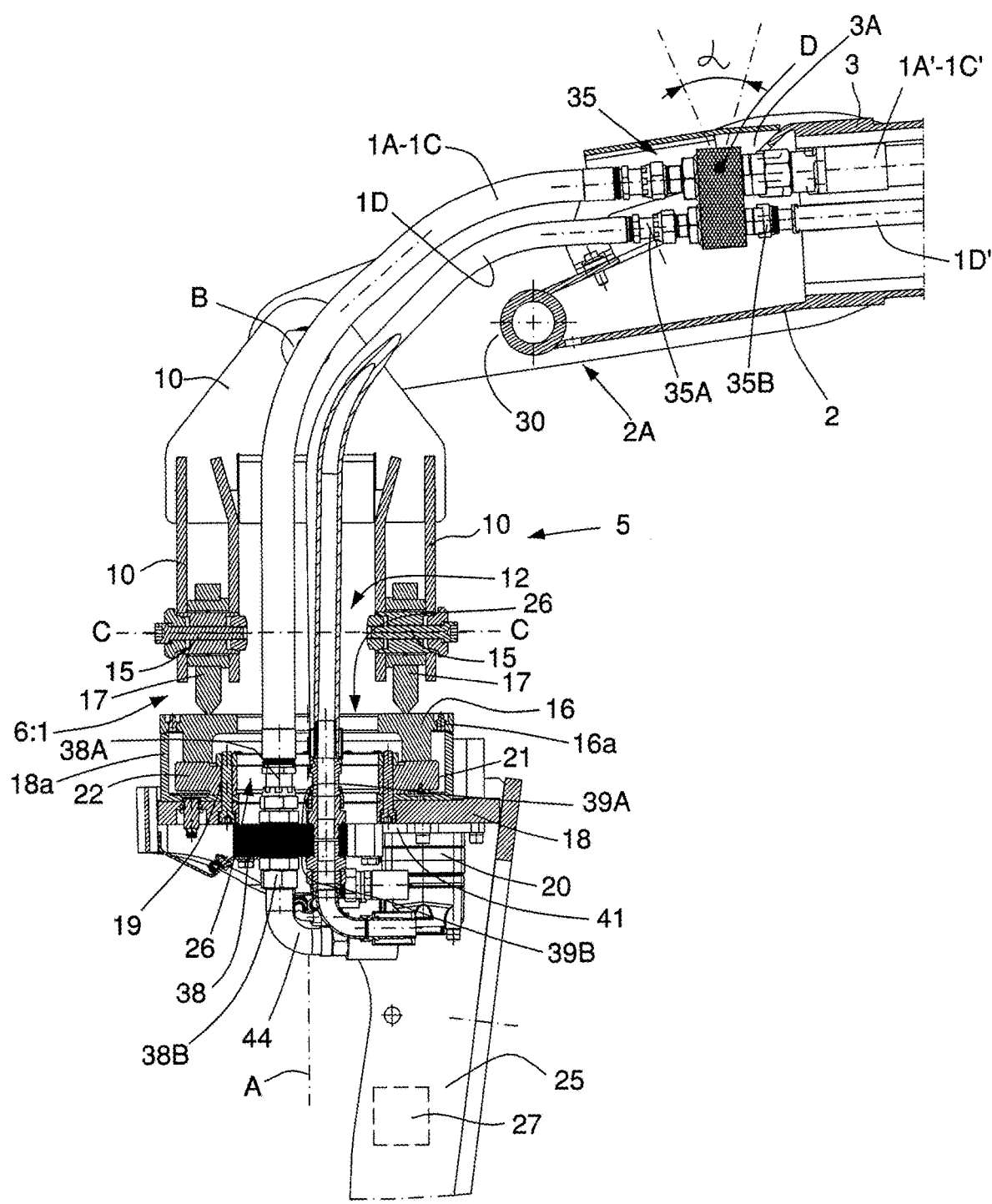
FIG. 2 shows a longitudinal section of the arrangement shown in FIG. 1, viewed from the side.

FIGS. 1 and 2 show an arrangement that according to the present invention is intended to house in a protective manner a free first hose package with four lines comprising three sections of flexible hydraulic hose 1A, 1B, 1C of elastomeric material and a free section of flexible protective hose of elastomeric material containing an electricity or data cable 1D. The said hydraulic and protective hoses are manufactured from a flexible elastomeric material and each one is constituted in one preferred embodiment of the invention by a conventional hydraulic hose.

The expression "first hose package" denotes the sections of hose 1A-1D that run freely and visibly exposed from an end, generally denoted by 2, of a crane arm 3 to a hydraulically powered tool 4 that can be pivoted in a horizontal plane and that is suspended at the end of the crane arm through a link arrangement 5 and a rotator 6 that is a component of the tool. The tool 4 can be rotated around its own axis of rotation by the rotator 6, i.e. around a first axis A that is normally oriented vertically. In the case in which the tool 4 is constituted by a harvester unit, the rotator 6 can be used to set the harvester unit at the desired direction of fall for a tree that is to be felled. The above-mentioned first hose package 1A-1D is in connection with a second hose package 1A', 1B', 1C', 1D'. The expression "second hose package" denotes the sections of hose 1A', 1B', 1C', 1D' that are concealed or discretely arranged invisibly in the hollow interior of the crane arm 3 and arranged to extend along this.

As is shown most clearly by FIG. 3-FIG. 5, the hydraulic hoses 1A, 1B and 1C of the first hose package lead supply flow from pump to consumer through directional valve P, and return flow from consumer to tank through valve R, and, where relevant, return flow directly to tank T from consumer. The protective hose 1D surrounds one or several lines 1D:1 that can transfer electricity and/or data signals, either analogue or digital.

The rotator 6 comprises a unit located between the end 2 of the crane arm and the tool 4 that is, through an intermediate link 5:1 that is a component of the said link arrangement 5, suspended in a jointed manner at the end of the crane arm to be pivoted around two horizontal axes arranged to be perpendicular to each other, which axes will below be denoted by "second axis" and "third axis", respectively, and shown as B and C in FIGS. 1 and 2. The said second and third horizontal axes B, C comprise what are known as "open joints". In the design described here, all second and third axes B, C not only in the end 2 of the crane arm, but also in the intermediate link 5:1 and the rotator 6, are designed as what are known as "open joints", demonstrating fork-shaped shanks that interact with each other and each of which is limited by parallel side plates 10 located at a distance from each other.

As is shown in FIGS. 1 and 2, the said side plates 10 limit between them an intermediate space or compartment 12 in which the first hose package 1A-1D can pass. The jointed connection between each such second axis B and third axis C between opposing fork-shaped parts comprises a pair of opposing guide plugs 15. Each of the said pairs of guide plugs 15 has a limited length, such that they do not significantly intrude upon the space 12 that is formed between opposing fork shanks. Through the joint points at the guide plugs 15 being located at a mutual distance along the axis of each joint along the said second axis B and third axis C, the said "open joints" are obtained, i.e. a broad open joint construction that is lightweight and strong.

As is shown most clearly by FIG. 2, the rotator 6 comprises a stator with an upper part 16 and a front part 6:1 that demonstrates two parallel fastening lugs 17 or shanks located at a distance from each other that are united, through a pair of guide plugs 15, in a manner that allows pivoting, with a lower end of the intermediate link 5:1, in the said third axis C. The rotator 6 has a rotor with a lower part 18 that is suspended, through a pivot bearing 19, in a manner that allows pivoting at the upper part 16 and at which lower part a hydraulic torque motor 20 is fixed attached. The output drive shaft of the torque motor 20 is equipped with a toothed wheel 21 (not visible in the drawing), which interacts with a cogged gear 22, that is fixed united with an external running ring that is in the pivot bearing 19 and that is united with the upper part 16, the inner running ring of which pivot bearing is united with the lower part 18 of the rotator 6. A part 16a that that protrudes radially from the upper part 16 forms a sealing plane together with an upper edge part of a ring-shaped, cover 18a that accompanies the lower part and that surrounds the cogged gear 22. Thus, when the torque motor 20 is activated, the lower part 18 of the rotator will be pivoted relative to the upper part 16 around the first axis A, and in this way relative also to the end 2 of the crane arm 3.

A stop means 24, that includes a first stop peg 24:1 arranged in the upper part 16 and a second stop peg 24:2 that interacts with this arranged in the lower part 18, limits the pivoting motion of the tool 4 in the horizontal plane to one revolution or approximately 360°. It should be understood that the upper part 16 of the rotator 6, where this upper part functions as a stator, is stationary, i.e. it does not participate in the rotation of the tool 4 around the first axis A. A holder 25 is fixed united with the lower part 18 of the rotator 6 intended to support a harvester unit, a timber gripper or similar tool.

The rotator 6 comprises at its centre a penetrating hole 26 or a depression that is coaxial with the vertical first axis A and that extends with varying diameter through the upper part 16, cogged gear 22 and lower part 18 of the rotator 6. The penetrating central hole 26 forms in this way a penetration or communication channel that thus permits the first hose package 1A-1D to run down in the centre of the rotator 6 for the connection and transfer of hydraulic fluid and electricity and data to a region under the rotator. It should be understood that the term "penetration" as it is used here should be interpreted in its broadest meaning and can, of course, include any arrangement at all that permits hydraulic fluid and electricity and data to be transmitted centrally down through the rotator to a region under the same.

The said electricity and data that are led in the protective hose 1D through the cable 1D:1 may include measurements and positional data for control and regulatory equipment in the form of, for example, a directional valve 27 (not visible in the drawing) that is arranged in a region below the lower part 18 of the rotator 6, at the holder 25. Through the setting of the directional valve 27, it is possible to supply the hydraulic torque motor 20 and any other consumers that are components of the tool 4 with hydraulic fluid, without the need for complicated swivel solutions. As a consequence of the extent of rotation of the tool 4 around the first axis A being limited to 360°, electricity and data can be transferred in the cable 1D:1 without the need for an electrical swivel connector.

As is made clear by FIG. 3 and FIG. 5, the end 2 of the crane arm is designed as an "open joint", demonstrating the form of a protruding fork that is limited in the sideways direction by parallel side plates 10 located at a distance from each other. Between the said side plates 10, the fork-shaped end of the crane arm is terminated in an end section that demonstrates a lower protruding part 2A. The lower protruding part 2A of the end section 2 demonstrates a convex curvature with relatively large radius in order to form a support surface 30 for the said first hose package 1A-1D. In the design of the invention described here, the said lower protruding end section 2A comprises a circular piece of tube welded between parallel ends of a sheet metal jacket.

As is shown most clearly by FIGS. 2 and 3, the end 2 of the crane arm is equipped with inlet and outlet for hydraulic fluid at its end through the said three hydraulic hoses 1A, 1B, 1C as is suggested with flow arrows in FIG. 3, and it is equipped with inlet and outlet for electricity and data through one or several cables in the fourth protective hose 1D. For this purpose, the hollow crane arm 3 is provided with, in a first opening 3A that faces the end 2 of the crane arm at one of its ends, a first holder 35, the task of which is to control and support in a retaining manner, at the said first opening 3A, the said first hose package 1A-1D that runs between the end 2 of the crane arm and the tool 4.

The said first holder 35 is designed as a block with connections 35A, 35B for the connection of a first end of the said visible first hose package 1A-1D and of a first end of the said hidden second hose package 1A'-1D', respectively. One of the said connections 35A, 36B comprises a swivel arrangement 36 with a fixed and rotatable part, respectively, to which swivel arrangement 36 not only the first end of the three hydraulic hoses 1A-1C that are members of the said first hose package, but also the fourth protective hose 1D, are connected.

The holder 35 is located above the lower protruding part 2A of the end section and is united in a manner that allows pivoting with the said opening 3A through guide plugs in the form of screws in order to, as is illustrated by a double arrow in FIG. 2, pivot in a vertical plane around a fourth axis denoted D. The said fourth axis D is parallel to the second horizontal axis B at the upper fastening of the link arrangement 5 at the end 2 of the crane arm. The said second hose package 1A'-1D' extends in the hollow interior of the crane arm 3, which hoses are connected at one of their ends to one connector 35B of the holder 35, and extend further backwards in the longitudinal direction of the crane arm, with a certain degree of flexibility or slack, in order to permit the first holder 35 to carry out pivoting motion around the said fourth axis D.

FIG. 3-FIG. 5 show an example of a first embodiment in which the holder 35 comprises a swivel arrangement 36 that is provided with several holes 40, in this case four, in which separate hose swivels 36:1-36:4 are mounted. Reference number 45 denotes a yoke-shaped protector that is intended to be mounted over the holder with screws 46. It should be understood that what is characteristic for this embodiment is that each hydraulic hose 1A-1D for the supply or return of hydraulic medium, electricity or data is associated with a separate hose swivel 36:1-36:4. It can be mentioned that the hose 1D for the transfer of electricity and data through one or several internal cables lacks an electrical swivel, something that is possible since the range of rotation of the rotator 6 around the axis A is limited to 360°.

As is shown most clearly by FIG. 2, the first holder 35 has, in a normal condition in which the tool 4 is freely suspended at the crane 3 through the link arrangement 5, adopted such an angle α that the central axis of the swivel arrangement 36 is essentially parallel to the longitudinal axis of the crane arm 3.

An attachment 41 is arranged at the lower part 18 of the rotator 6, which attachment supports a second holder 38 designed as a block that interacts in holes with connectors 38A, 38B, for the connection of a second end of the said first hose package 1A-1D. The holder 38 has an upper surface in the drawing that will be referred to below as the "upper surface" 39A, and it has a lower surface 39B on the opposite side. Thus, the upper surface 39A of the holder is provided with first connectors 38A where a lower end of the hydraulic lines 1A-1C of the first hose package and the protective hose 1D that contains one or several cables for electricity or data, are connected. In a similar manner, the lower surface 39B of the holder 38 is provided with connectors 38B, to which a number of angular connectors 44 are connected in order to lead hydraulic fluid to and from a directional valve 27 (not visible in the drawings) mounted on the holder 25 and thus below the lower part 18 of the rotator 6. The said hydraulic torque motor 20 and other consumers are supplied with hydraulic fluid through the directional valve. Supply of electricity and data for positional control of the directional valve takes place through the said cables 1D:1, which, extending inside the said protective hose 1D, are connected to an actuator that is a component of the directional valve. Thus, the first hose package 1A-1D is arranged to extend in a retaining manner in an arc between the said first 35 and second holders 38.

Figure 6:
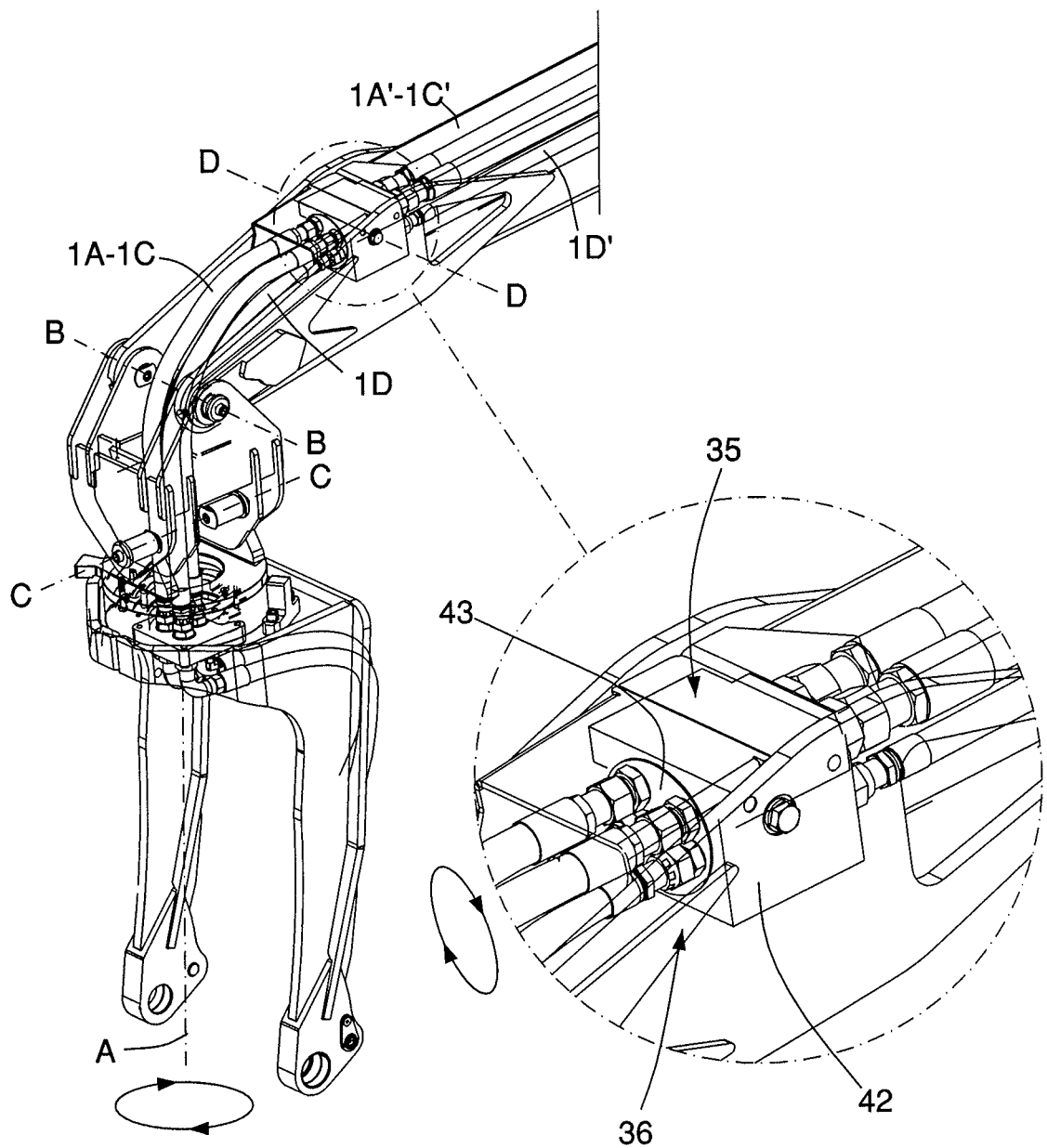
FIG. 6 shows a perspective view of an arrangement according to the present invention in a second embodiment where the first holder block comprises a swivel connection that allows the relevant hydraulic hoses to be connected for a joint swivel function.

FIG. 6 shows the present invention in an alternative embodiment in which the swivel arrangement 36 of the first holder 35 arranged at the end 2 of the crane arm is of the type that comprises a stator 42 and a rotor 43 that allow several hydraulic lines and, in this case, one end of all of the hydraulic hoses that are members of the first hose package 1A-1D to rotate around the central axis in a housing that serves as a stator 42, which housing can be pivoted in a vertical plane around the said fourth axis D. One end of the fourth protective hose 1D is, in this embodiment, connected to the said swivel arrangement 36 with its associated electrical swivel, by which it should be understood that the ability of the rotator 6 to rotate around the first axis A does not need to be limited.

Figure 7:
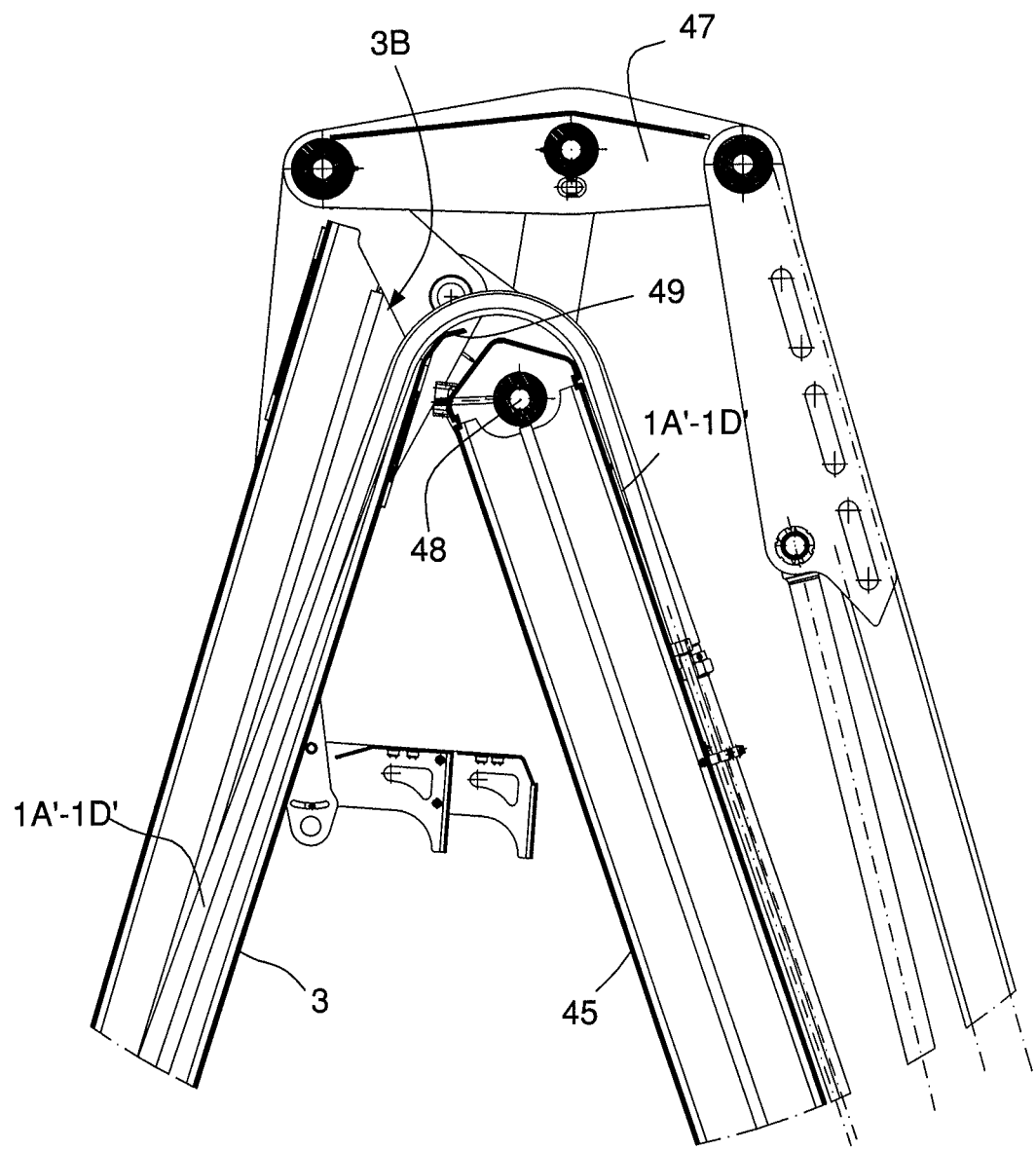
FIG. 7 shows a side view, partially in longitudinal section, of a part of a hydraulic hose that extends on the outer surface of a crane in order to—passing over a joint in a horizontal axis through a link arrangement between crane arm parts that are jointed one to the other—extend onwards into an end opening at a rear end of an external crane arm part.

FIG. 7 shows a longitudinal section of the second hose assembly 1A'-1D', which passes, on an upwardly facing outer surface, over a joint of a horizontal joint axis 48 through a link arrangement between crane arm parts 3, 45 of what is known as a "folding arm system", which arm parts are jointed relative to each other. This second hose package 1A'-1D' extends onwards into an opening 3B in a rear end of an external crane arm part 3. The said joint axis 48 permits the folding arm system to pivot in a vertical plane. With the aid of a hose guide 49 arranged in the said joint axis 48, which hose guide demonstrates a convex curvature with a relatively large radius, a smooth support surface is formed in interaction with the said second hose package 1A'-1D'. Through the fact that the second hose package 1A'-1D', which is positioned inside the hollow interior of the outer crane arm 3, can be pivoted around the said fourth axis D through the first holder 35, the formation of loose hydraulic lines, such as hydraulic hoses, in the said joint axis 48 can be avoided. It should be understood that, as a consequence of the ability of the first holder 35 to pivot around the axis D, not only the first hose package 1A-1D but also the second hose package 1A'-1D' will be held always extended in a controlled manner during movements of the crane. The problems with loose suspended loops of hose in a lifting arm system can in this way be eliminated.

The invention is not limited to what has been described above and shown in the drawings: it can be changed and modified in several different ways within the scope of the innovative concept defined by the attached patent claims.

What is claimed is:

1. An arrangement for the guidance of flexible lines, comprising hoses, cable or a combination of these, that run from a crane arm through an end section thereof to a tool, that is suspended at the crane arm through a link arrangement and a frame that is a component of a rotator for rotation around a vertical first axis and in a cardan manner around second and third horizontal axes,
  wherein the arrangement comprises
    a first holder arranged in an opening at one end of the end section,
    a second holder arranged in a region of the rotator positioned centrally around the first axis,
    a first hose package that is arranged to extend in a retaining manner between the said first and second holders, and
  at least one of the said second and third horizontal axes comprises an open joint,
    a protective hose that is a member of the first hose package comprises one or several cables that, extending inside the protective hose, can transfer electricity, data or a combination of these, to consumers of hydraulic fluid and control units that are components of the tool,
    a penetration arranged in a region of the rotator centrally around the first axis and permitting hydraulic fluid, electricity, and data or a combination thereof of that are led through the first hose package to pass through the rotator and onwards to a rotatable lower part of the same.

2. The arrangement according to claim 1, wherein each one of the said second and third horizontal axes comprises an "open" joint and the first hose package is arranged to run in a pathway having the form of an arc that can move freely over or cut through the centre of the second or third horizontal pivot axes of the link arrangement.

3. The arrangement according to claim 1, wherein the first holder comprises connectors for the connection of a first end of one or several of the hoses that is or are members of the first hose package.

4. The arrangement according to claim 3, wherein the connectors of the first holder comprise a swivel arrangement with which one end of one or several of the hoses that is or are members of the first hose package is connected.

5. The arrangement according to claim 1, wherein the second holder comprises connectors for the connection of a second end of one or several of the hoses that is or are members of the first hose package.

6. The arrangement according to claim 1, comprising pegs on which the first holder is arranged in the said opening for pivoting around a fourth axis that is parallel with one of the two horizontal axes of the link arrangement.

7. The arrangement according to claim 1, comprising a second hose package that is located inside the hollow interior of the crane arm and of which one or several of the hoses that is or are members of the said hose package is or are connected to connectors of the first holder.

8. The arrangement according to claim 1, wherein the penetration comprises a passage or communication channel that passes through the centre of the rotator and that is coaxial with the vertical first axis.

9. The arrangement according to claim 1, comprising a lower part that protrudes from the end of the crane arm and that, limiting a part of the end opening of the end of the crane arm, demonstrates a support surface with a convex curvature that is intended to interact in a smooth manner with one part of the said first hose package.

10. The arrangement according to claim 9, wherein the support surface of the lower protruding part is located at a level in the vertical direction under the first holder at the end opening.

11. The arrangement according to claim 1, wherein the crane arm comprises a second end opening located at a rear end of the same and through which second end opening a second tube assembly enters a hollow interior of the crane arm.

12. The arrangement according to claim 1, wherein the protective hose that is a member of the first hose package and that contains cables for electricity, data or a combination of these comprises a hydraulic hose.

* * * * *